Oct. 7, 1969   E. H. MANUEL   3,471,316
METHOD OF FORMING A FLEXIBLE ORGANIC LAYER ON
METAL BY A PULSED ELECTRICAL
ABNORMAL GLOW DISCHARGE
Filed June 14, 1965   3 Sheets-Sheet 2
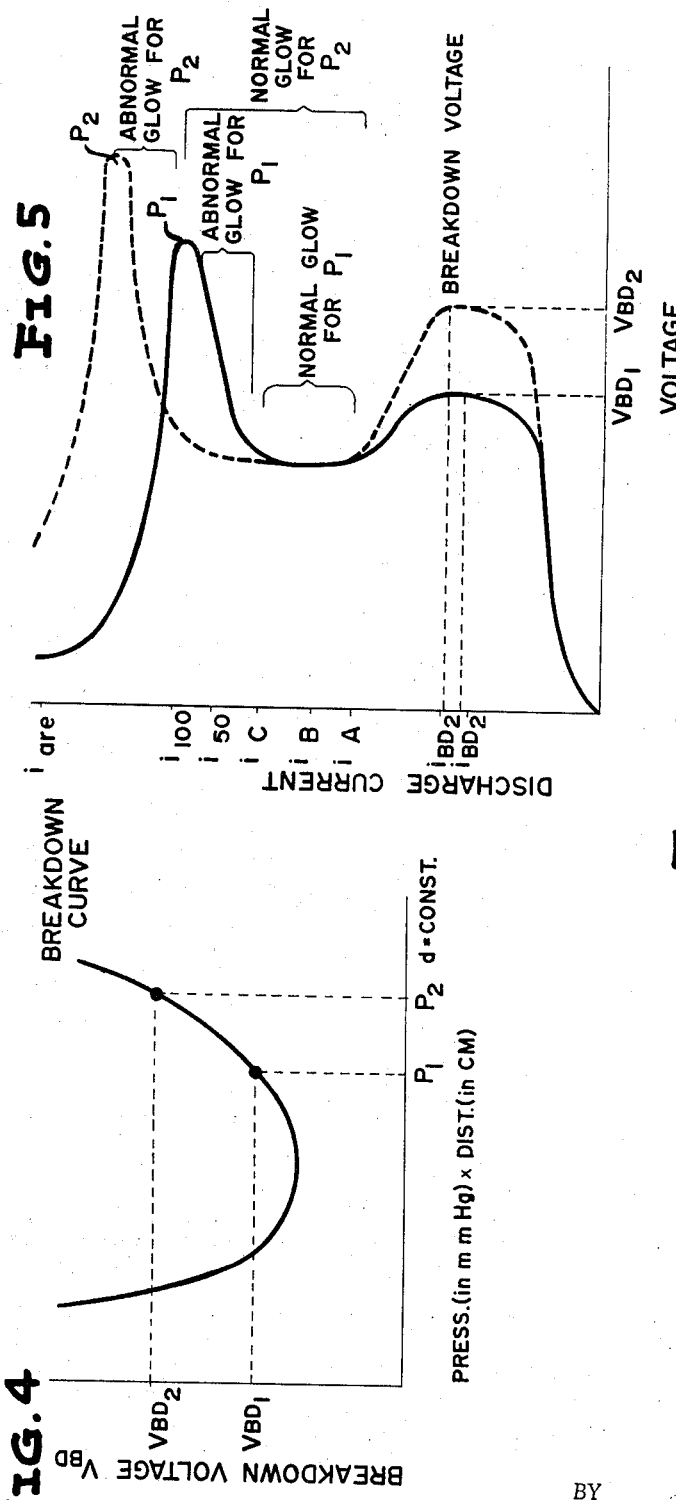
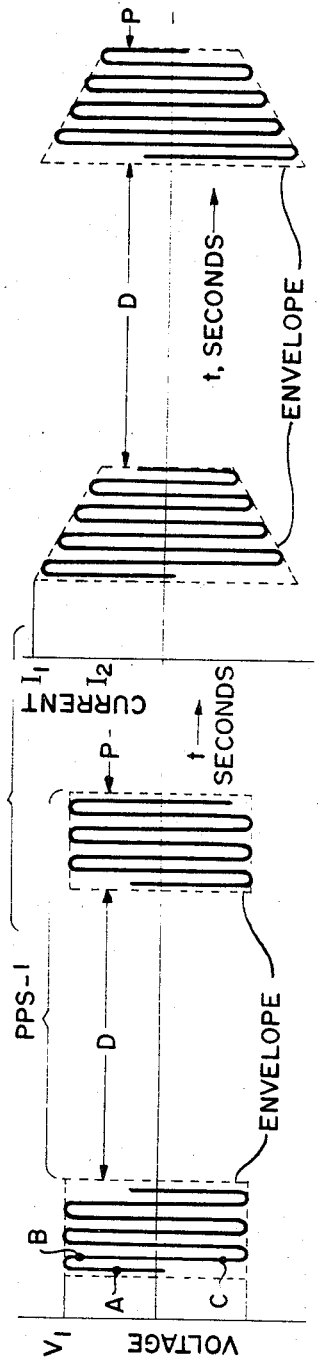
INVENTOR
ERNESTO H. MANUEL
BY
ATTORNEYS

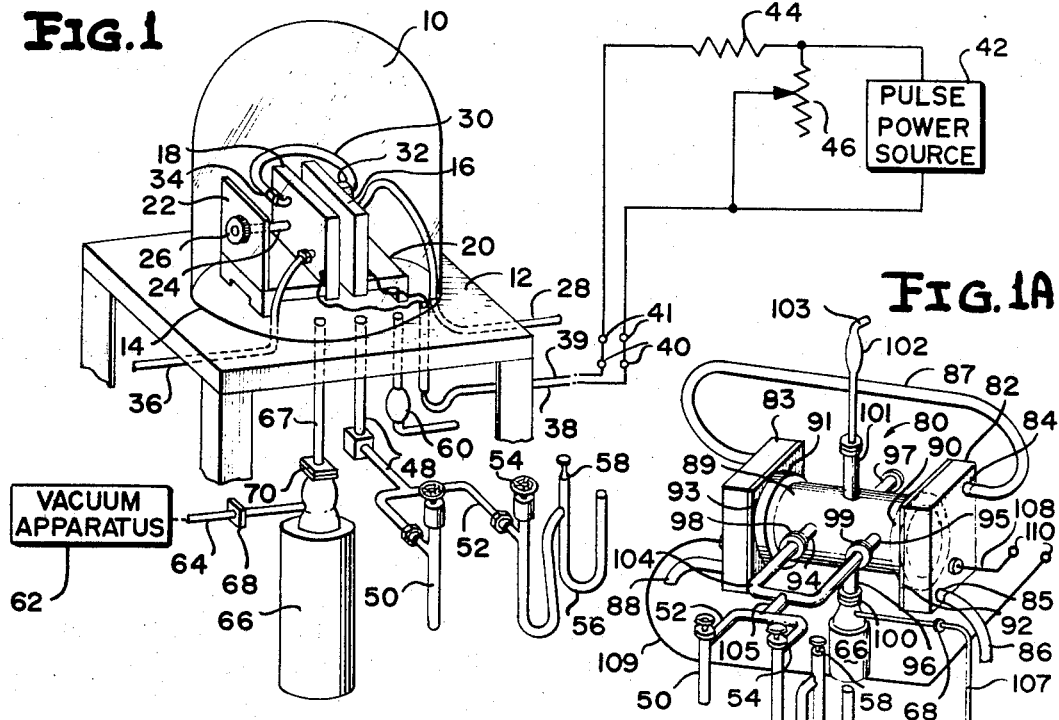

INVENTOR
ERNESTO H. MANUEL

United States Patent Office 3,471,316
Patented Oct. 7, 1969

3,471,316
METHOD OF FORMING A FLEXIBLE ORGANIC LAYER ON METAL BY A PULSED ELECTRICAL ABNORMAL GLOW DISCHARGE
Ernesto H. Manuel, Park Forest, Ill., assignor to Continental Can Company, Inc., New York, N.Y., a corporation of New York
Filed June 14, 1965, Ser. No. 463,582
Int. Cl. B05b 5/00; B44d 1/36
U.S. Cl. 117—93.3                                            36 Claims

ABSTRACT OF THE DISCLOSURE

A method of employing a pulsed electrical current to form a polymerized film of solid organic material upon the surface of an electrode is disclosed. The electrode is maintained in a glow discharge polymerization reactor and the monomer to be polymerized is introduced in gaseous form into the reactor and through the action of the intermittent current, a polymerized coating is deposited upon the electrode. The amperage of the current pulses is provided to produce an electrical discharge in the abnormal glow region occurring at an amperage higher than normal self-sustaining glow characteristics and at an amperage lower than that causing arcing in the reactor.

---

This invention relates to a method of employing pulsed current to form flexible films of solid organic material upon the surface of a metal by employing such metal as an electrode in a glow discharge polymerization reactor. More specifically, the energy necessary to maintain the glow discharge is supplied to the reactive zone, in which is contained as activable material, in order to form flexible organic layers upon the electrode surfaces.

The various phenomena of gaseous electrical discharges have been the subject of continuing investigation from the last part of the nineteenth century up to the present time. Generally, these are referred to as non-self-maintaining discharge, breakdown discharge, self-sustaining discharge, corona and brush discharges, glow discharge and arc discharge; in order of increasing current flow. Another term employed for several of these types of discharges mentioned is "silent discharge." Throughout the studies on these discharges, various gaseous substances have been used to sustain the ionization effects of the potential necessary to cause the discharges to occur.

Of these gaseous substances, the inert gases, such as argon and helium, have been, possibly, the most extensively employed due to their stability under discharge conditions. An early discovery was that many organic and non-organic gaseous substances, as well as liquid substances, were modified, degraded or thickened by a discharge of sufficient intensity. Thus, gaseous substances, such as methane, ethane and benzene, and in general the lower alkane gases, have been utilized to produce both liquid and solid products by causing various types of discharges to occur through a body of such gas. Other liquid hydrocarbon mixtures have been modified by causing the liquid to flow between two electrodes across which an electrical discharge is sustained. Generally, the effect upon such liquid hydrocarbons is to thicken or to polymerize the same without a solidification. For these alterations in the chemical make-up of the materials employed, both direct and alternating current flow has been suggested with similar products resulting.

Certain early literature in the 1920's and later, referred to the deposition of solid coatings from benzene by subjecting the monomer vapors thereof to a glow discharge generated by a Telsa coil at low pressures. The coatings produced upon the interior of the apparatus were brittle and had a tendency to crack and peel upon standing. Other vapors, such as toluene, p-xylene, nitrobenzene, as well as other materials, have been stated to form similar brittle layers. Other early statements have been that wax-like substances were deposited upon the cathode of a D.C. glow discharge utilizing paraffin hydrocarbon in the gaseous state. Much of this early art does not set out how the various variables of the electric discharges are to be controlled so that a solid product rather than a liquid product or a very soft wax-like product is formed. Other statements of these early research projects have set out that various of the above types of electric discharges were used on a variety of organic vapors in order to produce a range of liquid and solid products, some of which were adherent to the equipment while others were not. The types of electric discharges used have been referred to as ozonizer discharge, semi-corona discharge, corona discharge and electrodeless discharge. Other art which is further removed from polymerization processes is that of the disruptive discharge or the arc discharge. Generally, the occurrence of arcing in the low pressure electric discharges is undesirable as any useful products formed are degraded or destroyed thereby.

While many of the different types of electric discharges have been reported in the early art, the more recent art has particularly concentrated upon the glow discharge. This type of discharge occurs at low pressures and only over a rather narrow range of glow current densities between the electrode surfaces. In line with the undesirability of disruptive type discharges or arcing discharges, the recent art has proposed to limit the current causing the glow discharge to prevent such arcing. When such a current limitation is effected, continuous coating may be formed from several organic gases upon either one or both of the electrode surfaces if the electrical parameters are properly controlled for the gaseous substance used. At other operating conditions, the coatings appear to be discontinuous, spotty or of a totally unusable nature. All of the coatings deposited according to these statements of the prior glow discharge polymerization methods have a tendency to be either very soft and spongy or to be hard and brittle and, hence, to make bending and fabrication of the metal electrode, when removed from the discharge vessel, impossible. This brittleness and lack of adhesion to the metal substrate seriously lessens or impairs the value of such a polymerization process on a commercial basis.

Still other prior art has stated that the glow zone may be controlled when particularly shaped electrode surfaces are employed by controlling the conditions of spacing and gas pressure so that breakdown voltage is not attained over the entire presented surface area of the configured electrode surfaces. This approach, while having utility, does not alter the character of the coating deposited and these are subject to the above described extreme physical states which limit the usefulness of the deposited coatings themselves.

In all of this above-mentioned prior art, a consistent problem appears to be that of low reproducibility. The electrical parameters which are chosen for one system do not allow the same type of coating to be produced with another reactive system. In many instances the statements are that no coating is produced when the electrical parameters are slightly changed or when a different reactive system is employed without altering the electrical parameters.

Therefore, it is an object of the present invention to provide a reproducible method of glow discharge polymerization whereby the metal electrode surfaces may be coated with an organic coating which is of a flexible and highly adherent characteristic and is generally comparable to the conventional metal coating lacquer enamels.

Another object of the invention is to provide the improvement in methods of sustaining an electrical discharge through an activable gas by passing current between a pair of spaced electrode surfaces at conditions or electrical parameters to produce a continuous coating on a metal electrode surface, in which the energy is supplied in the form of pulsed current in order to produce a continuous coating which is flexible and coherent with the electrode surface.

Yet another object of the invention is to provide a method of forming a solid organic coating upon a substrate by first placing the substrate in a vessel and maintaining a sub-atmospheric pressure within the vessel of a vapor of a substance activable by an electric field and thereafter establishing an electric field through said vapor to the substrate by applying a pulsed electrical charge therethrough to effect formation of a non-arcing self-sustaining electrical discharge condition in the vapor and at the surface of the substrate and maintaining the electrical charge for a time sufficient to deposit a desired thickness of the coating upon the substrate.

In order to attain the above objects, a unidirectional current having a pulse width of from 1 microsecond to 2.5 milliseconds and a duty cycle of $10^{-4}$ to 0.25 percent or an alternating current having a pulse width of from 0.10 second to 5 seconds and a duty cycle of 16 to 90 percent may be employed.

Yet another object of the present invention is to provide a method of forming a flexible solid organic layer upon a metal substrate by first placing a pair of metallic electrodes in an evacuated vessel, introducing a gaseous monomer substance into the vessel in order to maintain a sub-atmospheric pressure and thereafter supplying a pulsed electric current to the pair of electrodes to produce a non-arcing self-sustaining electrical discharge through the gaseous substance. The gasoeus monomer substance is preferably either styrene or a mixture of styrene and methyl methacrylate, together with an optional minor percentage of a radical terminator compound. For attaining this object, the pulse widths and duty cycles of the above objects may be employed.

Yet another object of the present invention is to provide the method of sustaining an electrical discharge through an activable gas by passing current between a pair of spaced electrode surfaces at conditions to produce a continuous coating on a metal electrode surface in which the improvement provided is in supplying the electrical current to the electrode surfaces in the form of pulsed unidirectional current at a current density of 0.5 to 1.4 ma./cm.$^2$ and at a peak voltage of from 600 to 1200 volts in order to produce a continuous coating which is flexible and adherent to the electrode surfaces. The discharge is maintained until a coating of desired thickness is deposited as determined by the intended use for the coated metal. As in the above object, the preferred activable gas is either styrene or a mixture of styrene and methyl methacrylate containing at least 30% styrene, together with an optional minor percentage of a radical terminator compound.

In order to attain this object of the invention, pulsed alternating current at a current density of 0.165 to 1.2 ma./cm.$^2$ may be employed with a peak-to-peak voltage of from 600 to 1200 volts.

Another object of the present invention is to provide a method of making a metal-organic layer laminate which is deformable and fabricable as an integral unit by subjecting a gaseous monomer substance to a glow discharge between two metal electrodes created by imposing a pulsed unidirectional current of a current density of 0.5 to 1.4 ma./cm.$^2$ between the electrodes at a potential of from 600 to 1200 volts and with a pulsed width of from 1 microsecond to 2.5 milliseconds and a duty cycle of $10^{-4}$ to 0.25 percent or a pulsed alternating current of a current density of 0.165 to 1.2 ma./cm.$^2$ between the electrodes at a potential of from 600 to 1200 volts peak-to-peak with a pulse width of from 100 milliseconds to 5 seconds and a duty cycle of 16 to 90 percent.

Yet another object of the present invention is to provide a method of sustaining an electrical discharge through an activable gas by passing current between a pair of spaced electrode surfaces at conditions to produce a continuous coat on the electrode surfaces by supplying pulsed unidirectional current to the electrodes at a current density of from 0.5 to 1.4 ma./cm.$^2$ or a pulsed alternating current at a current density of from 0.165 to 1.2 ma./cm.$^2$ and a potential of from 600 to 1200 volts.

Another object of the present invention is to provide a method of forming a flexible solid organic layer upon a metal substrate to produce a metal-organic layer laminate which is deformable and fabricable as an integral unit consisting of, placing a pair of spaced metallic electrodes in an evacuated vessel, introducing a gaseous monomer substance selected from the group consisting of styrene and mixtures of styrene and methyl methacrylate, together with a minor part of a radical terminator compound to maintain a pressure of from 500 microns to 2.5 millimeters Hg within the vessel and supplying a pulsed unidirectional current or a pulsed alternating current to the pair of metallic electrodes at the electrical parameters as in the above objects, in order to produce a continuous glow discharge and discontinuing the glow discharge prior to the development of an arcing condition.

Another object of the present invention is to provide a process of forming a continuous, flexible, metal adherent coating on a metal electrode by maintaining an electrical discharge through an activable gas. Through passing current between a pair of spaced electrode surfaces by first initiating a self-sustaining non-arcing electrical discharge at a pressure, electrode spacing and voltage at which breakdown potential is instantaneously exceeded, current transmission may be produced across the electrodes in excess of that for a uniform surface coverage by the electrical discharge. Thereafter pulsed unidirectional current or pulsed alternating current may be supplied to sustain the electrical discharge at a voltage at least as great as during the initiation. The pulsed current used for initiating and sustaining the glow has a pulsed width and duty cycle as set out above.

A further object of the present invention is to produce a coating for a metal surface by the method of the above objects.

These and other objects will be more readily understood by the following detailed description, claimed subject matter and drawings in which:

FIGURE 1 is a perspective view of an apparatus for carrying out the process of the present invention by which the flexible coatings may be deposited upon a metal substrate, and includes a pulse generator circuit.

FIGURE 1A is a perspective view of a modified apparatus for carrying out the process of the invention which is shown connected to the pulse generator circuit of FIGURE 1.

FIGURE 2 illustrates the waveforms of typical voltage and current pulse trains created by the pulse source of FIGURE 1, wherein a constant D.C. voltage is maintained.

FIGURE 3 illustrates the waveforms of typical current and voltage wave trains generated by the pulse source of FIGURE 1, wherein the D.C. current is held constant during the electrical discharge.

FIGURE 4 is a schematic view of the breakdown voltage vs. pressure × electrode spacing curve of the present method.

FIGURE 5 is a diagrammatic graph showing the electrical discharge curves, wherein the solid line curve is for a first low pressure and wherein the dotted line curve is for a second and higher pressure.

FIGURE 6 is a schematic view of the current and voltage A.C. pulse trains created by the pulse source of FIGURE 1, wherein a constant voltage is maintained.

Figure 7A:
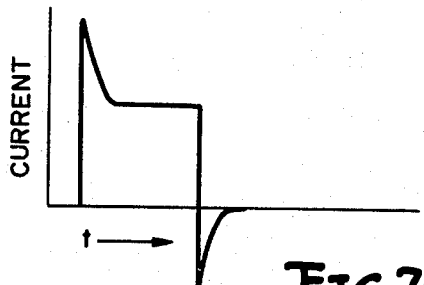
FIGURES 7A and 7B are waveforms illustrating the transient performance when utilizing external circuirty having a small time constant compared to the pulse on-time, P.

Referring now to FIGURE 1, a bell jar 10 is fixed to a base plate 12 with interposed gasket material and stopcock grease 14 for providing a gas-tight connection therebetween. A pair of plate holders 16 and 18 are supported inside a bell jar 10 on mounting plate 20. Holding plate 18 is slidably supported upon support plate 20 and is connected to end plate 22 by screw 24 which passes through the plate 22 and is in threaded engagement therewith. A knurled knob 26 is provided on the unconnected end of screw 24 for ease in adjusting the spacing between the holding plates. By rotation of knob 26, the spacing between holding plates 16 and 18 may be varied over a considerable distance. Generally, holding plate 16 is stationary but may be moved to other stationary positions upon support plate 20 from the particular position shown in FIGURE 1. Holding plates 16 and 18 consist of hollow metal rectangles through which a cooling fluid may be circulated. A fluid coolant inlet conduit 28 is shown passing through the undersurface of plate 12 and into the outside surface of holding plate 16. Connecting conduit 30 connects rear port 32 of holding plate 16 with rear port 34 of holding plate 18. An exit coolant conduit line 36 is connected to the outside surface of holding plate 18 and passes through plate 12 to a sump (not shown).

The cooling fluid allows a temperature to be maintained on the holding block. The coolant extracts the heat build-up in the electrode pieces upon which the coating is to be deposited by electrical discharge.

A pair of electrical leads 38 and 39 are shown passing up through the undersurface of plate 12 and into contact with holding plates 16 and 18, respectively. These leads are connected to a pair of terminals 40 which is, in turn, connected to a connecting pair of terminals 41. Pulse source 42 is connected to terminals 41 through a series-connected circuit resistor 44 and a variable resistor 46 connected in parallel with the terminal pair 40 and the pulse D.C. source 42.

The electrode pieces which are coated according to the present invention are clipped onto the opposing surfaces of holding plates 16 and 18 by conventional metallic clips (not shown). The electrode pieces consist of flat metal rectangular sheets which entirely cover the opposed surfaces of the holding plates and, in general, are fabricated from tinplate, blackplate (CMQ), or aluminum. Other common metals which are used for metal fabrication may be employed. As the electrode pieces are in direct contact with the holding plates, the electrical connections between the electrode pieces and the holding plates are sufficient to permit the passage of current from the pulse source 42 without arcing or sparking. When the electrode pieces used are coated, they may be unclipped from the holding plates and then fresh electrode pieces inserted for the next coating operation. In this manner the apparatus of FIGURE 1 may be used repeatedly to produce specimens according to the present invention. This step-wise method of coating the electrode pieces is not to be taken as limitative upon the method and coating claimed by the present invention.

Gas conduit 48 is connected to the space under bell jar 10 through plate 12 and has at the exterior end thereof a holding vessel 50 for the storage of an activable vaporizable material. An intermediate conduit 52 is provided with an air bleed valve 54 connected between a moisture absorber tube 56 and the main conduit 48. A needle valve 58 is interposed in the line from absorber 56 to air bleed valve 54 for regulation of minute quantities of dry air into the space in the interior of bell jar 10, for raising the pressure inside bell jar 10 up to atmospheric, for removal of the bell jar, and the electrode pieces.

A thermo-couple gauge is connected through the plate 12 by conduit 60, for determining pressures attained at various positions in the bell jar 10. The thermo-couple sensing device employed can be a resistor connected as one leg of a Wheatstone bridge network. The current supply to the network heats this resistor and a voltmeter and a galvanometer can be employed to measure its power expenditure and measure resistance. As the thermal conductivity of the gas depends upon its pressure and controls heat dissipation from an element of elevated temperature placed therein, the device provides a convenient measure of the gas pressure.

A vacuum apparatus 62 is connected through conduit 64 with a Dry Ice-acetone trap bottle 66 which is, in turn, connected to the space within bell jar 10 by conduit 67. Both conduits 64 and 67 have coupling connections 68 and 70 therein.

FIGURE 1A shows a modification of the device of FIGURE 1. The glow discharge coating device 80 has removable electrically conductive end pieces 82 and 83 which function as heat sink elements and are, therefore, preferably constructed from copper or a copper alloy. Both end pieces are hollow and have ports for entry of a coolant. Ports 84 and 85 are located in diametrically opposite corners of the rectangular form of end piece 82. Like ports are located in opposite end piece 83. Port 85 is connected to a coolant conduit 86, which is, in turn, connected to a coolant fluid source. A bridging conduit 87 is connected between port 84 and one of the ports of end piece 83. A fluid conduit 88 drains the heated coolant to a sump (not shown). The reaction chamber 89 has flanged portions 90 and 91 by which it furnishes support for the electrode pieces 92 and 93, respectively. These electrode pieces are held between respective end pieces and the adjacent flanged portions 90 and 91. When the gases within chamber 89 are being withdrawn to maintain low pressures, the atmospheric pressure acting normal to the end pieces is sufficient to provide a clamping action for the assembly.

The reaction chamber 89 has auxiliary ports 94, 95, 96 and 97 through which entering and exiting gases may flow. The first two ports are entry ports while the last two are exits. Port 96 is employed when the reaction products are to be trapped in the Dry Ice-acetone bottle 66 while port 97 is used for studies involving determination of transient species from the plasma region within chamber 89. The exit ports 96 and 97 both have valving means (not shown) to allow concurrent or independent use. For ease of observation, the chamber 89 is constructed of retort glass and for facility of connections, the auxiliary ports have flanged ends 98, 99 and 100 integral therewith.

An instrument port 101 is similar in construction to the auxiliary ports and houses a thermo-couple gauge in the enlarged portion 102 in tube 103.

The flanged ends 98, 99 and 100 of the chamber ports allow ease of manipulation as do the coupling connections 68 and 70 in FIGURE 1. Ports 94 and 95 are connected through their respective flanged ends 98 and 99 to a U-tube 104 which has a connection tube 105 in the bottom portion thereof. Tube 105 corresponds to conduit 48 of FIGURE 1 and the elements attached thereto are a holding vessel 50 for the activable material; an intermediate conduit 52 and a moisture tube 56 connected in the same manner as for FIGURE 1 with the same valves; air bleed valve 54; and, needle valve 58.

Port 96 is connected to a vacuum apparatus 62 through a Dry Ice-acetone trap bottle 66, as in FIGURE 1. A coupling connection 68 is provided between conduits 106 and 107.

Electrical conductors 108 and 109 are connected to the opposed end pieces 82 and 83 and in turn form a pair of terminals 110 at their opposite ends. These terminals are connected to the terminals 41 of the pulse power source 42 of FIGURE 1 when operation is desired and thereby replace terminal pair 40.

The outside distance between chamber flanges 90 and 91 was 12 cm. in the experiments run, thus allowing an accurate control over the electrode spacing during the discharge.

The pulse source 42 passes pulse energy across the space between the separated holding plates 16 and 18 of FIGURE 1 and the end pieces 82 and 83 of FIGURE 1A. The pulse energy may be maintained at a constant voltage as shown in FIGURE 2 or at a constant current as shown in FIGURE 3. Typical waveforms of current in FIGURE 2 and voltage in FIGURE 3 are shown for the case of constant amplitude voltage and constant amplitule current, respectively.

The current waveshape of FIGURE 2, when the trigger pulse is applied at a constant amplitude voltage, and the voltage waveshape of the FIGURE 3 when the trigger pulse is applied at a constant amplitude current, are primarily caused by the external circuitry. The external circuitry may be modified to provide identical constant amplitude voltage and current waveforms in both FIGURES 2 and 3 without effecting the coating process.

FIGURE 2 has marked thereon the pulse wave train variables. P is the pulse width, D is the rest period between individual pulses, and the total pulse period is P plus D. The pulses per second (PPS) is, therefore, defined by the reciprocal of the pulse period as by the equation:

(1) $$PPS = 1/(P+D)$$

The duty cycle for this wave train may be defined as:

(2) $$\text{Duty cycle} = P/(P+D)$$

which may be described as either a decimal duty cycle or a percent duty cycle which is attained by multiplication of the decimal duty cycle by 100.

The limits of P for a D.C. pulsed energization are from 1 microseconds ($10^{-6}$ seconds)) to 2.5 milliseconds ($2.5 \times 10^{-3}$ seconds) and D may vary between 2 microseconds ($2 \times 10^{-6}$ seconds) to 1 second. Therewith, the percent duty cycle variation is from $10^{-4}$ to 0.25 percent. The pulses per second (PPS) may range between 1 to 333,333.

The voltage $V_1$ marked on the wave train of FIGURE 2 may vary between 600 volts and 1200 volts. The corresponding peak current $i_1$ is from 10 ma. to 70 ma. A like variation is present for FIGURE 3 in which $i_3$ may vary between 10 ma. and 70 ma. and the peak voltage $V_2$ may vary between the same limits as $V_1$.

With respect to the current limits of 10 to 70 ma., these limits are required by the particular size of the electrode pieces used in the apparatus of FIGURE 1. The particular electrode pieces used had an effective area such that the current density over such area was between the limits of 0.5 to 1.4 ma./cm.² The current density (J) is a critical electrical parameter in that a proper electrical discharge will not occur at very low J values and an unstable or arcing electrical discharge will occur at high values of J. Other critical parameters are the spacing distance between the metallic electrode pieces which are clipped to the opposing surfaces of holding plates 16 and 18. This distance may be varied throughout a fairly wide range with corresponding adjustment of operating pressure. The preferable spacing, according to the present invention, is from 0.7 to 12 cm. Another variable which becomes critical, for reasons hereinafter explained, is the operating pressure within the bell jar 10. It has been found preferable to operate the apparatus at from 500 microns to 2.0 mm. Hg.

The temperature of the metallic electrode substrates or pieces is generally controlled to between 10° C. to 30° C. by passing cooled fluid through conduit 28 and out conduit 36, of FIGURE 1, or through the conduits of FIGURE 1A. A wider range of temperatures, from −40° C. to 50° C. may be employed where adequate control may be had over the other variables.

The breakdown voltage ($V_{BD}$) and the product of the electrode spacing, $d$, and the operating pressure $p$, are related through an empirical relationship known as the Paschen curve. This relationship specifies the condition at which a discharge of a self-sustaining and continuing nature is first initiated. A similar relationship exists for non-activable gases, such as helium and argon, but the relationship does not apply in either case after the continuous discharge has been established. Consequently, it is of little significance in ascertaining the proper operating parameters in order to produce usable organic coatings upon metallic electrode surfaces.

This relationship as defined by the Paschen curve defines no upper limit on the current density (J) or upon the employment of continuous or discontinuous energization, and it cannot be employed for continuous operation as it only defines a transitory breakdown condition of the electrical discharge. A breakdown curve, according to the Paschen relationship, is set out in FIGURE 4. This curve has been described as being the relationship where constant separation ($d$) is maintained. At a first pressure, $p_1$, a breakdown voltage of $V_{BD_1}$ is necessary in order to attain a breakdown condition in the activable material at the low pressure between the electrode plates. At a higher pressure $p_2$, a greater breakdown of voltage, $V_{BD_2}$, is necessary for breakdown. By selecting the operating voltage $v_1$, according to FIGURE 2, to be in excess of the voltage for the pressure $p_1$ present in the ball jar 10 or chamber 89, a continuous and instantaneous glow may be struck during each pulsed interval, P.

FIGURE 5 shows, diagrammatically, a discharge curve wherein voltages across the electrodes is plotted versus the discharge amperage. At an amperage of $i_{BD_1}$ and a pressure of $p_1$, a breakdown voltage $V_{BD_1}$ is necessary in order to have an initial self-sustaining electrical discharge. By maintaining this voltage and increasing the amperage to $i_A$, a decrease in the operating voltage is noted and an electrical discharge with visible effects occurs. At this initial occurrence (occular), only the very center portion of the electrode surfaces are covered with a visible glow. Increasing the amperage to $i_B$ results in approximately the center one-half of the electrode surfaces being covered with a visible glow effect. By increasing the amperage to $i_C$ approximately 100% coverage of the electrodes by a visible type glow occurs. When an activable gaseous material is present between the electrode surfaces over the range of amperages from $i_A$ to $i_C$, some limited deposition of an organic coating over the area covered by the glow effect occurs. Generally, this amount of deposit is insignificant on even a laboratory scale. Operation of the electrical discharge between these limits is not feasible for commercial success due to the fact that it is extremely difficult to maintain the current exactly at the $i_C$ level at which 100% of the substrate is covered. If the total area is not covered with the glow, portions of the metal must be trimmed away from the coated metal for a uniform coating to be presented. This is obviously impossible on a commercial basis and metal pieces unevenly coated over the center portion are of little utility.

The electrical discharge from $i_A$ to $i_C$ on the discharge curve is identified as the normal glow region. Above currents of $i_C$ the operating voltage increases rapidly and the glow is said to be in the abnormal glow range. By operating the present process at currents and operating voltages in the abnormal glow region, a continuous allover coating of the electrode areas may be assured and a higher deposition rate may be attained. It is preferred to operate between 20 to 50% over drive into the abnormal region. This percentage is calculated by the total distance from $i_C$ to $i_{100}$. The current at $i_{50}$ can be used as a safe upper limit for currents $i_1$ or $i_3$ of FIGURES 2 and 3, above.

Beyond the current value of $i_{100}$, increases in the current cause a sudden and often uncontrollable decrease in the operating voltage and the striking of an arc which, if occurring after an organic deposit on the electrode surface, will form a burn-out hole and render the total coating unusable for many purposes.

A similar type of curve is shown in FIGURE 5 by the dotted line which corresponds to a higher pressure $p_2$ and has a higher breakdown voltage $V_{BD_2}$. The solid curve and the dotted curve correspond to the two points on the Paschen curve of FIGURE 4.

In FIGURES 2–5, the proportional representation has been drawn for demonstrative purposes and not for true representation of the stated quantities and electrical parameters.

By imposing electrical energy in the form of pulsed wave trains as set out in FIGURES 2 and 3, the peak $i_1$ or the imposed $i_3$ is chosen for the particular pressure in the discharge devices to correspond to approximately 20 to 50% overdrive into the abnormal glow region. Thus, when each pulse is imposed, the electrical discharge is immediately caused to occur in the abnormal glow region to attain the objectives mentioned above. This operating amperage, of course, exceeds the amperage over the normal glow range and the voltage may either exceed or be less than breakdown voltage as is apparent from the relative proportions of the breakdown voltage point and the abnormal glow region curve of FIGURE 5.

By operating the electrical discharge in the abnormal glow region, a greater quantity of active species is created from the activable gas than would be created at the normal glow condition. The greater number and, therefore, proportion of the active species to the neutral gas molecules, would tend to furnish reactive sites for other neutral activable gas molecules and would, hence, cause a combination of the activable gas in the glow region and at the surface of the electrodes in rather short and multitudinous molecular forms. Such short molecular forms would tend to produce a grainy or brittle organic coating which would be highly cross-linked and, therefore, would not be flexible or fabricable with the underlying metallic electrode upon which the deposit occurs. Such a coating would be of low commercial utility in that it could not be bent and fabricated with the underlying metallic substrates.

According to the present invention, this difficulty is overcome by pulsing the energy in the form of a pulsed wave train as shown schematically in FIGURES 2 and 3. By so pulsing the energy, the formation of the activated species occurs only over a short pulse period and the associated rest period during which no energy is impressed upon the system allows the active species time to react with a greater number of neutral activable gas molecules to form longer molecular chain lengths upon the substrate electrode surfaces. The pulsing of the energy to create more flexible coatings on the underlying electrode surface may be employed at either the abnormal or the normal glow condition in order to attain products which are different and more usable than those of the prior art. The prior art, by using continuous excitation at the normal glow conditions, did not attain this flexibility of the coating. In addition, when operating in the normal glow range, these prior art coatings were subject to being impressed upon only a limited area of the electrode surface.

By operating in the abnormal glow range and quenching the overly reactive greater number of active species by allowing rest periods between pulsed energizations, a more commercial and a fabricable and flexible organic coating is provided for metallic substrates.

The following examples of practice are intended to be descriptive of various manners in which the method of this invention may be used to produce the flexible coating according to the present invention. The examples of practice are not intended to be limitative of the applicant's invention. In all data the current densities are expressed as root-mean-square (RMS) values.

EXAMPLE I

Five runs were made at the electrical parameters set out in Table 1, below. The operation procedure was to first place the activable material which is gaseous at the low pressures utilized in the reaction chamber 89, into container 50 of FIGURE 1A. In this series of runs, commercial grade styrene was employed. The monomer solution contained a small concentration of t-butyl cathechol polymerization inhibitor. The temperature of the end pieces 82 and 83 was then adjusted to approximately 15° C. by circulating coolant water through conduit 86 and withdrawing to the sump (not shown) through conduit 88. The end pieces 82 and 83 holding the 34 cm.² electrode pieces were separated by the 12 cm. spacing mentioned in the description of FIGURE 1A. The pressure was then reduced to approximately 1 mm. Hg by vacuum apparatus 62 and then maintained between 800 to 1200 microns Hg. The styrene liquid in container 50 was then allowed to vaporize into the evacuated interior of chamber 89 to displace the remaining air. After an equilibrium condition had been attained in this fashion, the pulsed source was turned on to supply unidirectional current and a visible electrical discharge immediately was formed between the two end pieces 82 and 83. The coating times employed were from 2 to 15 minutes. After the coatings were built up on each pair of electrode substrates fitted onto the end pieces 82 and 83, the pulsed current was turned off and the pressure in chamber 89 was gradually allowed to come up to atmospheric by opening needle valve 58 and air bleed valve 54 to equalize the pressure in the interior of chamber 89 with the ambient pressure. The end electrodes were then removed and examined. Following this procedure, the five runs set out in Table 1 were made and the coatings produced were tested.

TABLE 1

| Run | Voltage, Peak V. | Current, ma. | PPS | Pulse Width, Microsec. | Run Time, Min. | Cathode Deposit Wt. (mg.) | Pressure, Microns Hg |
|---|---|---|---|---|---|---|---|
| 1 | 800 | 30 | 500 | 100 | 4 | 2.5 | 1,200 |
| 2 | 800 | 40 | 20 | 100 | 15 | 7.2 | 900 |
| 3 | 800 | 40 | 200 | 50 | 10 | 8.5 | 900 |
| 4 | 900 | 40 | 500 | 50 | 2 | 4.2 | 900 |
| 5 | 800 | 30 | 200 | 100 | 10 | 7.0 | 800 |

Run 1 was prematurely interrupted due to the occurrence of arcing between the electrode pieces. This was thought to have resulted from the high operating pressure. The cathode coated electrode pieces of runs 3–5 were removed after shutting off the pulse generator and bringing the chamber to atmospheric pressure and then subjected the coating to a post heating operation. This heating was at 170° C. for 10 minutes in an air oven.

The samples made in this series of runs were then tested by (a) microscopic examination, (b) bending of substrate metal through 90–180°, (c) Scotch tape test for metal adhesion. Test (a) revealed a surface uniformity and continuity and the thickness of deposit appeared uniform. There was a low degree of cracking of the coating at the upper limit of test (b) but not as great as when a continuous D.C. energization was used for establishing a comparison. As the coatings were thin, most of these samples were "lifted" from the substrate by test (c).

The general improvement in flexibility was readily observable on the basis of test (b) and similar tests carried out on continuous A.C. and D.C. coatings. Thus, the only limited property was the thickness of the deposits which could have been increased by running for longer times. In general, the post heated operation performed on the samples of runs 3–5 did not appear to change the characteristics over those of run 2, so that all coatings had good heat stability.

EXAMPLE II

A second series of runs were made in the device of FIGURE 1A with a mixed activable gas composition. The composition was styrene and isoamyl nitrite in the weight ratio of 100:2. The unidirectional or D.C. peak voltage was varied between 850 to 1200 volts and the peak current was varied between 30 to 70 ma. while the pulse width was varied between 50 to 100 microseconds, the pulses per second (PPS) was varied between 200 and 300 and the electrode spacing was the fixed distance of 12 cm. Coolant fluid was passed through the lines 28, 30 and 36 to cool the holding plates to 15° C. and then the pressure was reduced by vacuum apparatus 62 to approximately 1 mm. Hg. The pressures during the various runs varied between 900 to 1200 microns Hg. In this series of runs the total time was held constant at 5 minutes for each coating operation. The electrode areas were 34 in.² each.

The run data is set out in Table 2, below.

evacuation of the reaction chamber 89 as in the above examples. The peak voltage was 1100 volts while the peak current was varied between 30 to 40 ma. and the electrode piece spacing was 12 cm. The pulse width was varied from 100 to 1000 microseconds and the pulsed repetition rate or PPS was either 20 or 1000. Total coating times of from 5 to 20 minutes were employed and a somewhat larger backing plate was utilized so that the interior surface area of each of the electrodes was 34 cm.² and these were held to from 15 to 17° C. by coolant fluid. The operating pressure of the activable gas composition was from 800 to 1000 microns Hg.

Table 3 sets out the data for this series of runs.

Test (a) showed the coating of run 1 to be very thin and free from pinholes and of a light color. An observation during the run was that the coating which was initially formed appeared to be dispersed during the run and then reappeared when the run time was approaching five minutes and thereafter remained. Tests (b) and (c) showed this coating to be fabricable and favorable for use in fabrication employments.

Like observations for tests (a), (b) and (c) were recorded for run 2 and observations during the run were that a thin yellow coating was produced after two minutes of run time after which time the coating appeared to turn red and to be dispersed from the electrode surface. At four minutes time a yellowish green coating was produced which adhered and remained on the surface.

Similar data was recorded for both runs 3 and 4. During run 5 there was incurred some problems of arcing at isolated points between the electrodes. The coatings which

TABLE 2

| Run | Voltage, Peak V. | Current, ma. | PPS | Pulse Width, Microsec. | Run Time, Min. | Cathode Deposit Wt. (mg.) | Pressure Microns Hg |
|---|---|---|---|---|---|---|---|
| 1 | 1,200 | 30 | 200 | 100 | 5 | 11.3 | 1,000 |
| 2 | 920 | 30 | 200 | 100 | 5 | 2.0 | 1,000 |
| 3 | 1,000 | 40 | 200 | 100 | 5 | 2.3 | 1,000 |
| 4 | 1,000 | 40 | 200 | 100 | 5 | | 1,200 |
| 5 | 850 | 30–40 | 300 | 50 | 5 | | 1,200 |
| 6 | 980 | 70 | 300 | 50 | 5 | | 900 |

The deposits formed by these six runs were flexible as determined according to tests (a) and (b) above. The metal adhesiveness of these films was not sufficient in that most of the coating was "lifted" by test (c). Hence, the coatings here produced were not deemed desirable for those fabricating usages in which the fabricated material was handled before, during and after fabrication.

The flexibility, however, was still superior to that observed by the same tests carried out on coatings deposited by continuous A.C. or D.C. energization.

were not affected by the arcing points were light in color and appeared to be quite flexible and could be bent 180° without lifting or cracking and was not "lifted" by the Scotch tape test, of Example 1. Taking into consideration the possibility of eliminating arcing by use of alternating current, this run shows particularly good operating conditions. Note that the time was only five minutes whereas a coating weight of 3.4 milligrams was built up which is a much greater weight than the weight when the lower pulse per second intervals were used.

TABLE 3

| Run | Voltage, Peak V. | Current, ma. | PPS | Pulse Width, Microsec. | Run Time, Min. | Cathode Deposit Wt. (mg.) | Pressure Microns Hg |
|---|---|---|---|---|---|---|---|
| 1 | 1,100 | 30–40 | 20 | 100 | 5 | 2 | 800–1,000 |
| 2 | 1,100 | 30–40 | 20 | 500 | 5 | 0.8 | 800–1,000 |
| 3 | 1,100 | 30–40 | 20 | 500 | 20 | | 800–e,000 |
| 4 | 1,100 | 30–40 | 20 | 1,000 | 5 | 1.3 | 800–1,000 |
| 5 | 1,100 | 30–40 | 1,000 | 100 | 50 | 3.4 | 800–1,000 |

EXAMPLE III

This series of runs was conducted by utilizing the device of 1A in order to ascertain the effect of pulse width variations, for unidirectional current, upon the properties of the deposited coatings. Five runs were made with the same activable gas composition as used for Example II, above. This composition of styrene and isoamyl nitrite in the proportion of 100:2 was introduced after the

EXAMPLE IV

A series of nine runs was made in order to isolate the proper running conditions for producing the flexible coatings of the present invention. Pulsed D.C. current was impressed across the electrode surfaces spaced 2 cm. apart with an activable gas of styrene and isoamyl nitrite in a weight proportion of 100:2, as in Examples II and III, above. The pressure was held between 600 to 1800 microns Hg. The voltage varied between 550 to 800 volts peak voltage and the current varied between 40 to 70 ma. peak amperage. The surface area of the electrodes was 36.0 cm.² and the total reaction times were from 2 to 10 minutes. The pulse width was varied between 100 and 1000 microseconds and the pulse per second was varied between 15° C. and 50° C. The apparatus of FIGURE 1 was used.

The data set out in Table 4, below, shows preferred operating conditions for the pulsed D.C. coating process.

TABLE 4

| Run | Voltage, Peak V. | Current, ma. | PPS | Pulse Width, Microsec. | Run Time, Min. | Cathode Deposit Wt. (mg.) | Pressure Microns Hg |
|---|---|---|---|---|---|---|---|
| 1 | 550 | 40-60 | 200 | 100 | Varied | | 500-900 |
| 2 | 550 | 40-60 | 500 | 100 | | | 500-900 |
| 3 | 800 | 40-60 | 500 | 500 | 10 | 7.7 | 600 |
| 3 | 700 | 40 | 500 | 500 | 10 | | 600-800 |
| 5 | 700 | 40 | 500 | 500 | 2 | 3.0 | 600-800 |
| 6 | 700 | 40-60 | 500 | 500 | 2 | | 1.000 |
| 7 | 700 | 70 | 500 | 1.000 | 10 | | 1.200 |
| 8 | 700 | 70 | 500 | 1.000 | 10 | 9.1 | 1.800 |
| 9 | 700 | 70 | 500 | 1.000 | 7 | 7.9 | 1.800 |

The holding plates 16 and 18 of FIGURE 1 were cooled to approximately 15° C. with tap water coolant in all of the runs except the last two. Runs 8 and 9 were allowed to run at 50° C. electrode temperature. In other respects the runs were similar to the above examples in procedural steps.

A general observation is that the weights of the selected specimens which were weighed, runs 3, 5, 8 and 9, show fairly high deposition rates for the times of the runs. The coatings deposited, while flexible enough to meet many fabrication tests, were not sufficiently flexible to pass the most rigorous adhesion and flexibility test of being flanged at the outer portions of a circular shape to create an upstanding chuck wall pursuant to the manufacture of a container end. This "can end forming" test is considered to be a very rigorous test of flexibility of coatings as the metal substrate is thin enough to be bent in very sharp angles and is so bent during forming which forces the coating to be likewise pulled through these sharp angles. Some cracking and discontinuities were noticed under microscopic examination of the formed can parts made by these runs.

At the longer run times arcing occasionally developed and, hence, there is a particular problem with the use of unidirectional pulse current which is not present for the use of pulsed A.C. current.

The samples from runs 3, 4, 6, 7 and 9 were evaluated with respect to the "can end forming" tests and by test (c), as in Example I. The results are set out in Table 5, below.

approximately the same electrical parameters as runs 6 and 7 but at lower pressures of 600 to 800 microns. The coating weight deposited in run 3 was similar to the coating weight of run 9, both being high coating weights.

The evaluation observations for the post heat treatment sepcimens show that test (c) was passed, in part, by reason of the Scotch tape lifting only a top layer of the material deposited. Hence, the adhesion to the metal was stronger than the cohesive forces within the deposited material which allows its use for certain fabrication wherein contact with solid bodies can be avoided in later usage.

Again, runs 6 and 7 do not show a passable test (c), but run 7, after the post heat treatment, does pass the Scotch tape test. Thus, a post heat treatment is capable of rendering an otherwise low substrate-adhesive material more adherent to the metal.

The "cracking by forming" information was obtained by subjecting the flat coated substrates to a "can end forming" operation as set out above, between Tables 4 and 5. After removing the formed can end from the forming die, the coated surfaces were washed with petroleum ether to remove the lubricant employed, dried and then subjected to a standard copper sulfate electrolytic etching test. By run number 3 it can be seen that the post heat treatment lowers the cracking which occurred with forming. A general conclusion from an overall reading of the columns sub-headed "sharp bend" and "inner bend" is that these specimens, as prepared by the pulsed unidirectional energy input, are not sufficiently good products with or without post heat treatment to allow bending through these sharp angles without cracking. This is a very rigorous test for adhesion and lack of cracking by forming. Many commercial employments require much less adhesion and freedom from cracking and peeling. Thus, while the coatings set out show some cracking at the bend portions, these are only the very sharp angle bends approaching between 90 and 180° metal substrate deformation. Many metallic fabrications are accomplished by bending through angles less than

TABLE 5.—TEST EVALUATIONS FOR EX. IV

| Run | Post Heat Treatment | Cracking By Forming | | | Test "C" Scotch Tape Lifting |
|---|---|---|---|---|---|
| | | Sharp Bend | Inner Bend | Seal Area | |
| 3 | None | Much | Much | None | one. |
| 3 | 400° F. 10 min | Some | Some | Few pinholes | Top layer only. |
| 4 | None | Some | Much | None | None. |
| 4 | 400° F. 10 min | Much | do | do | Top layer only. |
| 6 | None | Much | Much | Much | All. |
| 6 | 400° F. 10 min | do | do | Some | All. |
| 7 | None | ⅔ of area | Pinholes | Pinholes | Much "lifting". |
| 7 | 400° F. 10 min | Much | do | None | None. |
| 9 | None | ½ of area | Pinholes | None | None. |
| 9 | 400° F. 10 min | Much | Much | Pinholes | Top layer only. |

The evaluation of the samples run according to the procedure set out in Example IV are those in which no post heat treatment had been effected. By these evaluation observations it is seen that samples 6 and 7 as prepared without post heat treating did not pass test (c). Table 4 shows that the pressure was above 1000 microns for these two runs. Hence, for a flexible and continuous coating at the other electrical parameters set out, this pressure appeared to be excessive. Looking now at runs 3, 4 and 9, without post heat treatment, it is seen that all of these samples passed the test (c). These runs were made at 90°, and in these portions of the specimens there was no cracking in many of the runs, as shown by the sub-headed column "seal area."

The coatings evaluated in Table 5 were thin due to the shutting down of the run in order to prevent arcing which was experienced to develop in times usually in excess of 10 minutes due to the fact that the cathode electrode became coated with the deposited organic material prior to the coating of the anode. This heavier coating caused the electron flow to concentrate and break through at a thinly coated area. These coatings of low thickness were evaluated as compared to those produced by using continuous D.C. of similar voltage and current densities with similar deposition times. The monomer mixture which was used was the same as in Example IV and with the pulsed D.C., the Scotch tape test was passed; upon bending to 120° there was no breaking or crazing at the bend area while at a 180° bend, there was such crazing. The pulsed D.C. samples did not pass the can end flanging test as set out in Table 5, above. Those samples run with continuous D.C. did not pass Scotch tape tests and crazed and cracked at both 120° and 180° bends and, obviously, did not pass the can end flanging or forming test.

Generally, for pulsed unidirectional current it has been found preferable to operate over a pressure range having a minimum of 700 microns Hg pressure with a fairly low electrode spacing of approximately 1 to 2 cm. and at a (J) current density of 0.5 ma./cm.$^2$ as a minimum. At these conditions with a corresponding voltage to that of the numerous examples of from 550 to 1200 peak voltage, the electrical discharge established is slightly into the abnormal glow region which causes a faster buildup of the organic deposit.

The occurrence of arcing at the higher deposition times of approximately 10 minutes can be avoided by utilizing pulsed A.C. current rather than the pulsed unidirectional or D.C. current. By utilizing alternating current pulses, the buildup of deposited organic material is equal on both of the electrode surfaces and, hence, one surface does not preferentially build up a thickness which then acts as a resistance to the ion transport effect.

When pulsed A.C. voltages are used, the minimum current density is maintained somewhat lower than that for the pulsed D.C. system and the pulsed width, P, and duty cycle is somewhat larger than for pulsed D.C. energization. For coating with styrene at 700 microns pressure, operation at current densities, J, of approximately 165 microamps (RMS)/cm.$^2$, and voltages of near 1000 volts peak-to-peak or 350 RMS has been found satisfactory. Generally, for pulsed A.C. energization, the pulse width varies from 0.1 to 5 seconds and the duty cycle may vary between 16 to 90 percent. D, the rest period, may vary between the same limits as P, and generally a rest period of approximately one second is preferred when operating with styrene for the reasons set out below.

The pulsed A.C. current consists of alternating current of 60 cycles per second, or less, up to 10 kc. per second.

FIGURE 6 shows a voltage wave train and the corresponding current wave train for the pulsed A.C. energization. The power source may be turned on at any point during the alternating cycle and, thus, may be turned on at a voltage of A or B or C. Thus, the pulse power source is operated non-synchronized for the electrical discharge system. The electrical parameters P and D, as well as PPS$^{-1}$ are set out, as in FIGURES 2 and 3, above. The dotted line envelopes around each of the pulse wave trains correspond to the unidirectional energy pulses in FIGURE 2.

Thus, the voltage $V_1$ in FIGURE 2 corresponds to the voltage $V_1$ shown in FIGURE 6 and $i$, and $i_2$ of FIGURE 2 correspond to $I_1$ and $I_2$ in FIGURE 6. The current waveshape in FIGURE 6 occurs for the same reason as the current waveshape of FIGURE 2. A wavetrain series having voltage and current waveform envelopes similar to FIGURE 3 exists when the apparatus is operated at constant current.

Figure 7B:
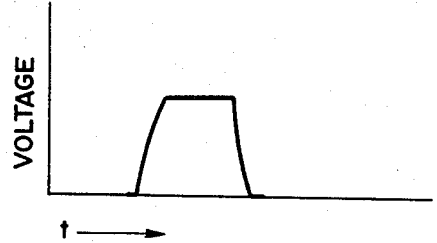

The transient condition present for the pulse wavetrains shown in FIGURES 2, 3 and 6 exist when the time constants of the external circuitry are large compared to the pulse time P. When the time constants for the external circuitry are small compared to the pulse time P, the current waveform which exists when the pulsed energy is maintained at a constant voltage is shown in FIGURE 7A and the voltage waveform which exists when the pulsed energy is maintained at a constant current is shown in FIGURE 7B. As mentioned earlier, the effects of the external circuitry on the voltage and current waveforms can be modified by changing the external circuitry.

Further, the voltage breakdown curve in FIGURE 4 applies to both the A.C. and the D.C. systems, as does the discharge amperage versus discharge voltage curve shown in FIGURE 5. The main differences between the employment of pulsed unidirectional current energization as opposed to the pulsed A.C. energization are the production of equally thick coatings on both of the electrodes by the A.C. system, whereas the cathode is preferentially coated with a thick layer in the unidirectional pulsed system and the production of more flexible coatings. Thus, the use of alternating current is preferred.

The following are examples of practice of the present invention with pulsed A.C. energization.

EXAMPLE V

The following electrical parameters were held approximately constant: electrode spacing, 1 cm.; voltage, 350 volts RMS; current, 10 ma. peak; frequency, 10 kc.; and P, pulsed width, 1 second, using the apparatus of FIGURE 1. The duty cycle was varied between 25 to 90 percent. The pressure was held approximately constant at 700 microns Hg, while the electrode temperature was held constant at 15° C. and times of 10 minute runs, each, were made. The activable gas employed was commercially available styrene, being approximately 97 percent pure. The electrode areas were 36 in.$^2$.

Two runs each were made at the various duty cycles, and the weights deposited upon a single electrode surface were calculated. The duty cycle was calculated by Equation 2 above. The data for this series of runs is set out in Table 6, below. This data was obtained primarily for the purpose of studying the lifetime of the active species.

TABLE 6

| Run | Pulse Width, P (Sec.) | Rest Period, D (Sec.) | Percent Duty Cycle | Weight Deposited (mg.) |
| --- | --- | --- | --- | --- |
| 1 | 1 | 1 | 50 | 12.0 |
| 1(a) | 1 | 1 | 50 | 12.9 |
| 2 | 1 | 2 | 33.3 | 10.0 |
| 2(a) | 1 | 2 | 33.3 | 10.0 |
| 3 | 1 | 0.75 | 57 | 13.7 |
| 3(a) | 1 | 0.75 | 57 | 14.4 |
| 4 | 1 | 0.50 | 66.6 | 14.2 |
| 4(a) | 1 | 0.50 | 66.6 | 14.0 |
| 5 | 1 | 3 | 25 | 6.4 |
| 5(a) | 1 | 3 | 25 | 5.9 |
| 6 | 1 | 0.10 | 91 | 19.0 |
| 6(a) | 1 | 0.10 | 91 | 19.1 |
| 7 | 1 | 1.5 | 40 | 7.7 |
| 7(a) | 1 | 1.5 | 40 | 8.6 |
| 8 | 1 | 2.5 | 28.6 | 6.5 |
| 8(a) | 1 | 2.5 | 28.6 | 5.9 |
| 9 | 1 | 2.0 | 33.3 | 8.0 |
| 9(a) | 1 | 2.0 | 33.3 | 8.2 |

By the above data, it is seen that those runs in which greater than 10 milligrams of organic material was deposited on an individual electrode surface, the duty cycles were all in excess of 33.3%. Thus, the rest period was under two seconds. However, run 7(a) shows that for a rest period lower than two seconds and a duty cycle higher than 33.3% (40%), a coating weight of less than 10.0 milligrams was deposited. This apparent inconsistency is explained by the fact that the active species which are created by the electrical discharge with styrene as an activable gas has been found, by calculation and experimentation, to have an average lifetime of approximately 1.2 seconds. Hence, rest times, D, longer than 1.2 seconds exceed the lifetime of the active species and, hence, there is a period during which most of the active species have decayed so as to no longer furnish reactive sites for the propagation of molecular forms. However, there are some residual active species which, when present at fairly long times, result in the deposition at a continuing and exponentially slower rate. That is, the 1.2 second lifetime of the active species is an average value for the active species and on an overall run maintaining the rest periods in excess of this time, results in a very low deposit rate during that part of the cycle which is the rest time in excess of 1.2 seconds. Hence, a preferred rest time for the use with styrene as the activable gas is 1 second, a time just prior to the ending of the average lifetime of the active species formed. Hence, as the molecular forms are approaching their optimum or the end of their forming rate, the system is given another pulse of current which then sets up a new reactive sequence.

A convenient method to calculate this lifetime of the active species is to compare the rate of deposition when using continuous A.C. of a standardized frequency with the rate of deposit using pulsed current at various rest periods, D. Using a standard current density of 165 microamps (RMS)/cm.$^2$, data of the type set out in Table 6 was

EXAMPLE VI

A series of runs was made in order to deposit an organic layer onto tinplate electrodes, clamped onto the holding plates 16 and 18 of FIGURE 1 and held at a spacing of 0.7 cm., by utilization of a gaseous monomer composition of styrene, methyl methacrylate and isoamyl nitrite in the weight proportions of 80:20:2.5. The electrode areas, as above, were 36 in.$^2$ each. A duty cycle of 50% was utilized and a frequency of 10 kc. The substrate temperature was 18° C. and the time was 5 or 10 minutes for the coating of each specimen. The pressure varied between 450 microns Hg and 800 microns Hg. The voltage was varied between 350 to 420 volts (RMS). The current varied between 30 and 60 ma. peak-to-peak. The pulsed width, P, was varied between 100 milliseconds and 1 second. The data for the variables of the various runs made is set up in Table 7, below.

TABLE 7

Figure 8:
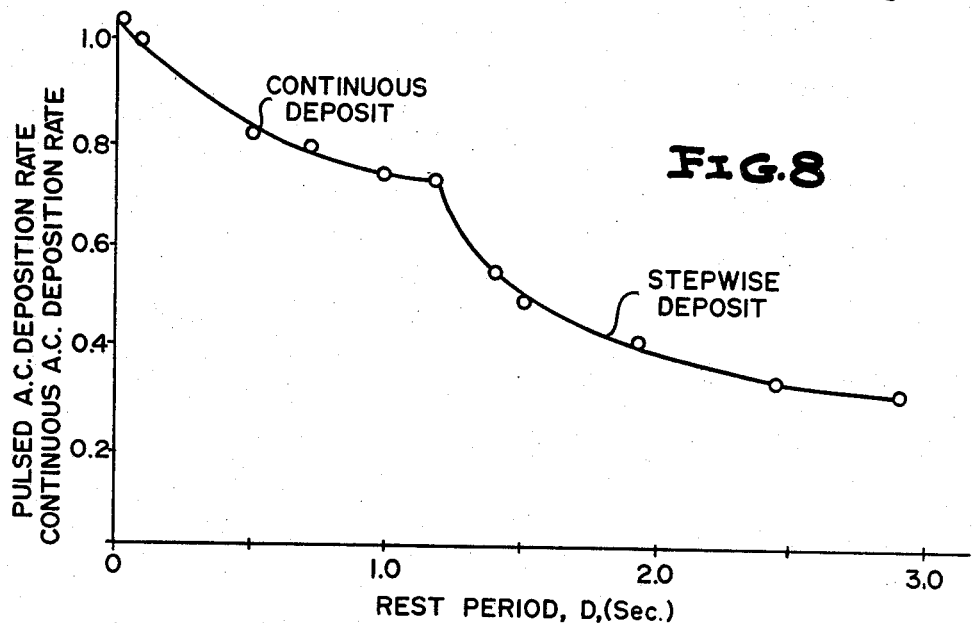
FIGURE 8 is a graph of the data recorded in Example V.

| Run | Amperage, ma. Pk-Pk | Voltage, V. (RMS) | Pulse Width P, Sec. | Rest Time D, Sec. | Run Time, Min. | Pressure, Microns Hg | Weight Deposited (mg.) |
|---|---|---|---|---|---|---|---|
| 1 | 36 | 350 | 1 | 1 | 10 | 600 | 18.6 |
| 2 | 60 | 385 | 1 | 1 | 10 | 850 | 21.1 |
| 3 | 40 | 420 | 1 | 1 | 5 | 450 | 5.7 |
| 4 | 60 | 420 | 1 | 1 | 5 | 500 | 6.9 |
| 5 | 16 | 350 | Continuous A.C. | | 5 | 500 | 6.3 |
| 6 | 16 | 350 | Continuous A.C. | | 5 | 500 | 6.6 |
| 7 | 40 | 350 | 1 | 1 | 10 | 800 | 12.0 |
| 8 | 40 | 350 | 1 | 1 | 10 | 800 | 12.1 |
| 9 | 40 | 350 | 0.5 | 0.5 | 5 | 800 | 7.8 |
| 10 | 40 | 350 | 0.5 | 0.5 | 5 | 800 | 8.4 |
| 11 | 40 | 350 | 0.1 | 0.1 | 10 | 800 | 14.0 |
| 12 | 40 | 350 | 0.1 | 0.1 | 10 | 800 | 12.7 |
| 13 | 40 | 350 | 0.25 | 0.25 | 10 | 800 | 16.8 |
| 14 | 40 | 350 | 0.25 | 0.25 | 10 | 800 | 15.1 |
| 15 | 40 | 350 | 0.25 | 0.25 | 10 | 800 | 12.8 |
| 16 | 40 | 350 | 0.25 | 0.25 | 10 | 800 | 13.6 |
| 17 | 40 | 350 | 0.10 | 0.10 | 10 | 800 | 13.8 |
| 18 | 40 | 350 | 0.10 | 0.10 | 10 | 800 | 14.9 |
| 19 | 40 | 350 | 0.50 | 0.50 | 10 | 800 | 16.0 |
| 20 | 40 | 350 | 0.50 | 0.50 | 10 | 800 | 13.7 |
| 21 | 40 | 350 | 1 | 1 | | 800 | 12.9 |
| 22 | 40 | 350 | 1 | 1 | | 800 | 12.2 | accumulated for pulsed A.C. discharge with styrene vapor. The current density of 165 microamps (RMS)cm.$^2$ is the J for the runs of Table 6. FIGURE 8 shows a plot of the ratio of the deposition in pulsed A.C. to the deposition in continuous A.C. for varying rest periods, D, obtained from Table 6. It is seen by this figure that the deposition rate ratio declines sharply past a rest period of 1.2 seconds which identifies the point at which the presence of the active species has greatly attenuated within the space between the electrodes. The portion of the curve shown with D from the continuous A.C. point of 0 to 1.2 seconds is the region wherein continuous deposit is occurring throughout the rest period of the pulsed deposition, whereas the second portion of the curve after the break is step-wise deposition which is caused to take place by each burst of pulsed energy. The data graphed in FIGURE 8 shows a point at D=1.2 seconds. This run was independently conducted to establish the point at what appeared to be the breaking point of the curve.

Figure 9:
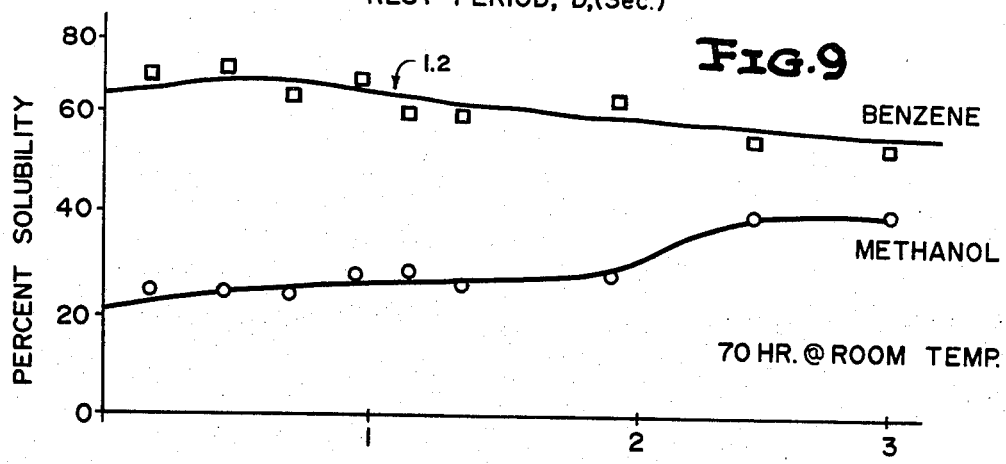
FIGURE 9 is a graph of the solubilities of the flexible organic layer deposited by the runs of Example V.

FIGURE 9 shows the solubilities of the various organic deposition coatings of Example V. The solubilities were tested by subjecting one-half of each portion of the film to a 70-hour treatment at room temperature in benzene and in methanol. The solubilities are graphed as a function of the rest period D. The percent solubility or extractability of the material deposited, without heat treatment, is important with respect to many commercial food container applications. The relatively high percent solubility in benzene over the portion of the curve at which the highest deposition rates occur indicates that further treatment, such as post heat treating, is desirable in order to provide low extractability for a pure styrene gaseous monomer vapor.

It can be seen from comparing the continuous A.C. coatings of the runs 5 and 6 with those of the remainder of the runs that a higher deposition rate is attained by the use of pulsed A.C. energization. This is particularly advantageous due to the fact that less power is required for the pulsed energization than the continuous A.C. energization. This gives the present process a greatly enhanced commercial factor over the continuous A.C. energizations, while at the same time providing a coating which is flexible and may be fabricated with the underlying metal substrate of the electrodes. By a comparison of the consecutive even and odd numbers, which were run as pairs at the same pulsed width and rest times, it can be seen that close correlation is not always attained for the deposition rate. The correlation of these results is roughly equivalent to the uncontrollable factors of the deposition rates attained such as gas flow variations through the spaced electrode pair and experimental weighing error.

The coatings weighed and tabulated in Table 7, with the exception of runs 5 and 6, passed the can end forming test as set out in Example IV, above. In addition, these coatings passed the three tests labeled as (a), (b) and (c) in Example I, above. These coatings are particularly advantageous from a commercial standpoint due to the lower power requirement to attain thick coatings and the greater flexibility attained and the absence of arcing and sparking even at long deposition times. At times as great as 10 minutes, a coating of sufficient thickness is provided for most coated metal fabrication employments. The coatings deposited have many mechanical and physical characteristics similar to thermoset lacquer finishes upon metal surfaces which are flexible with the underlying metal substrate.

EXAMPLE VII

A series of runs was made in the apparatus of FIGURE 1 (similar to the runs in Example VI) with a higher percentage of an amine compound (as a radical terminator) in the activable gas composition and the rest periods were varied over a considerable range, from 100 milliseconds to 5 seconds. The electrode spacing was 0.7 cm. The voltage was held roughly constant at 350 volts (RMS), while the current was held constant at 36 ma. peak-to-peak. The pressure was 800 microns Hg, while the substrate temperature was 18° C. Uniformly, the frequency of the alternating pulsed current was 10 kc. The activable gas composition employed was styrene, methyl methacrylate, and n-hexylamine in the proportions of 80:20:10. The data for these runs is set out in Table 8, below.

TABLE 8

| Run | Pulse Width P, Sec. | Rest Time D, Sec. | Run Time (Min.) | Weight Deposited (mg.) |
|---|---|---|---|---|
| 1 | 1 | 1 | 10 | 9.9 |
| 2 | 1 | 1 | 10 | 8.5 |
| 3 | 1 | 1 | 10 | 11.5 |
| 4 | 1 | 1 | 10 | 13.1 |
| 5 | 0.5 | 0.5 | 10 | 13.0 |
| 6 | 0.5 | 0.5 | 10 | 11.5 |
| 7 | 0.25 | 0.25 | 10 | 12.7 |
| 8 | 0.25 | 0.25 | 10 | 13.4 |
| 9 | 0.1 | 0.1 | 10 | 14.1 |
| 10 | 0.1 | 0.1 | 10 | 12.3 |
| 11 | 0.75 | 0.75 | 10 | 13.8 |
| 12 | 0.75 | 0.75 | 10 | 12.5 |
| 13 | Continuous A.C. | | 10 | 18.3 |
| 14 | Continuous A.C. | | 10 | 18.5 |
| 15 | 5 | 5 | 10 | 8.1 |
| 16 | 5 | 5 | 10 | 14.8 |
| 17 | 5 | 5 | 10 | 15.7 |
| 18 | 5 | 5 | 10 | 16.5 |
| 19 | 2 | 1 | 10 | 9.0 |
| 20 | 2 | 1 | 10 | 18.6 |
| 21 | 5 | 5 | 10 | 14.6 |
| 22 | 5 | 5 | 10 | 14.5 |
| 23 | 0.75 | 0.25 | 10 | 19.3 |
| 24 | 0.75 | 0.25 | 10 | 18.9 |
| 25 | 0.25 | 0.75 | 10 | 7.6 |
| 26 | 0.25 | 0.75 | 10 | 7.7 |

The electrode spacing was approximately 0.7 cm., while the duty cycle was held constant at 50% in all but the "continuous A.C." and last four runs. Run times of 10 minutes were employed.

The testing results from this number of samples showed that all are extremely flexible and passed the can end forming test of Example IV, as well as tests (a), (b) and (c) of Example I, above. Generally, it is seen by runs 23–26 that utilizing a short pulsed time of less duration than a short rest time is not advisable. Rather, the employment of a relatively long pulse width time with a short rest time results in higher deposition rates; however, the use of such short rest times increases the power consumption and on a commercial basis can be detrimental. Thus, using longer pulse widths and longer rest times but retaining the rest times in the area of 1 second, such as in runs 19 and 20, results in an equally high deposition rate without a power waste. These deposition rates are somewhat greater than deposition rates set out for runs 13 and 14 in which the metal coating was formed by the use of continuous A.C.

EXAMPLE VIII

A series of runs was made in the apparatus shown in FIGURE 1, utilizing both continuous and pulsed A.C. energization to provide a check on the data gathered and recorded as Example VII, above. Some of the coatings obtained were subjected to solubility and flexibility tests to determine the differences between the coatings deposited by continuous A.C. and by pulsed A.C. energization. The activable gas composition was styrene, methyl methacrylate and n-hexylamine in weight proportions of 80:20:10. The voltage was held close to 350 volts (RMS), the current was held constant at 36 ma. peak-to-peak and the pressure employed was 800 microns Hg. The same 10 kc. frequency as in Example VII was used for both continuous and pulsed A.C. runs. The 36/cm.$^2$ electrode pieces were, likewise, held at 18° C. In all runs a deposition time of 10 minutes was employed. The data recorded is set out in Table 9.

TABLE 9

| Run | Continuous A.C. | Run Time (Min.) | Weight Deposited (mg.) |
|---|---|---|---|
| 1 | Continuous A.C. | 10 | 19.7 |
| 2 | Continuous A.C. | 10 | 20.8 |
| 3 | Continuous A.C. | 10 | 20.4 |
| 4 | Continuous A.C. | 10 | 19.3 |

| Run | Pulsed A.C. Pulse Width, P, Sec. | Rest Time, D, Sec. | Run Time (Min.) | Weight Deposited (mg.) |
|---|---|---|---|---|
| 5 | 0.75 | 0.25 | 10 | 19.3 |
| 6 | 0.75 | 0.25 | 10 | 18.9 |
| 7 | 0.25 | 0.75 | 10 | 7.6 |
| 8 | 9.25 | 0.75 | 10 | 7.7 |

The organic coatings deposited by runs 3, 5 and 7 of Table 9 were subjected to a solubility test by subjecting a portion of the coated electrode pieces to immersion in methanol at room temperature for 24 hours. The net loss in weight was recorded as follows: Run 3, 3.2 mgs.; run 5, 7.9 mgs.; and run 7, 3.3 mgs. Due to the small masses involved, significant conclusions cannot be made on this data, with the possible exception that the solubility of the continuous A.C. run appears roughly equivalent to the solubilities for the pulsed A.C. runs. Portions of each of the coated electrode pieces were subjected to a flexibility test by repeatedly bending the coated metal with its coated surface inward of the bend angle. The bend angle was 180°, without the use of a small radius anvil. The coating of run 3 cracked and lifted on a single bend, thus illustrating the rigid nature of coatings deposited by continuous A.C. The coating of run 5 showed no lifting from the substrate after 4 bends, while the coating of run 7 was too thin for adequate comparison.

These flexibility tests illustrate the superior flexibility and metal adherent properties of the organic coatings deposited by controlled pulsed A.C. energization.

EXAMPLE IX

A series of runs was made by utilizing the apparatus of FIGURE 1 in order to determine the metal adhesion, flexibility properties, and corrosion protection presented by an organic coating formed from commercially pure styrene. The styrene was approximately 97% pure and contained a remainder of mainly para-tetriary butyl catechol with trace amounts of di-vinyl benzene and ethyl benzene. The adhesion was determined by pressure sensitive tape tests and valuated by standards based on conventional thermoset metal coatings. The flexibility was determined by bending tests as in Example VIII, above, with qualitative results recorded by a comparison of the organic coating deposited with conventional thermoset metal coatings. In a like manner the corrosion protection was determined by locating the coating thickness of a conventional metal coating which provided an equivalent protection against a standard etching by copper sulfate solution. The thickness of such a conventional coating is expressed as mgs./in.$^2$ and the coating weight is referred to as an equivalent coating weight.

The tests made upon the coatings deposited in this series of runs are those normally employed in the evaluation of conventional polymerization thermosetting coatings used in the metal container industry. A rating of "good" for the adhesion test indicates that the coating under test performs approximately equal to the presently employed thermosetting organic coating layers. A rating of "poor" for the adhesion test indicates a low and unacceptable degree of adhesion to the metal substrate.

For the flexibility test, a rating of "good" indicates an approximate equivalency between the flexibility as determined by bending tests between the conventional coatings and the coating deposited according to the runs conducted. A rating of "fair" for flexibility indicates a high degree of flexibility as measured by the bending tests which is sufficient for many metal fabrication steps but insufficient for the most rigorous tests such as can end flanging. When a coating thickness of the organic layer deposited according to the present invention is of a lower coating weight than that of the conventionally employed thermosetting metal coating compositions, it is deemed to provide greater corrosion protection than the coatings presently employed. On the other hand, when the coating weight of the material deposited is greater than the equivalent weight of a conventionally employed coating material, it is deemed less corrosion resistant and, therefore, to some degree, inferior in its ability to protect the coated metal from corrosion by the materials to be contained in metal containers fabricated from the coated metal.

Table 10 sets out the electrical parameters and electrode spacing, as well as cooling, which were employed in this series of runs. The pulsing of the alternating current was held constant for intervals of one-half second on and one-half second off, that is, $P=\frac{1}{2}$ second and $D=\frac{1}{2}$ second. In this series of runs the discharge time was held constant at 2 minutes and the electrode spacing constant at 2.2 cm. In all runs the voltage was 1000 volts peak-to-peak and the frequency was 6 kc. The electrode areas were both 36/in.$^2$ and the electrodes were of 85 lb. electrolytic tinplate.

resistance than the conventionally employed metal coatings. Thus, a thinner coating of the deposited organic material will provide the same corrosion inhibition as a much thicker coating of conventional polymerization thermosetting metal coating; hence allowing significant raw material cost reductions.

The adhesion of all of the coatings except the coating of run 3 was determined to be approximately equivalent to the adhesion of the conventionally employed coating materials. The flexibility was acceptable in all of the runs for many applications. Particularly, the first two runs, in which the electrode temperature was controlled only to room temperature, show superior over all properties for the coating deposited. Hence, an indication is that by maintaining the electrode temperature at or near room temperature, valuable metal coatings may be deposited by using commercial grade styrene at the conditions specified.

It is to be noted that runs 3 and 4, which gave, in part, unacceptable results, were run at the combination of lower electrode temperatures coupled with higher gas pressures than the other recorded runs. Thus, by using a higher gas pressure with a higher electrode temperature or a lower gas pressure with a lower electrode temperature, approximately equivalent organic films may be deposited.

EXAMPLE X

A second series of runs was made with the apparatus of FIGURE 1 in the manner of the immediately preceding example. Lower electrode temperatures of −30° C. and −40° C. were employed. Equivalent coating weights

TABLE 10

| | Electrical Parameters | | | Coating Data | | | |
|---|---|---|---|---|---|---|---|
| Run | Gas, mm. Hg Press. | Current P to P | Electrode Temp., ° C. | Coating Weight, mg./in.$^2$ | Equivalent Commercial Coating Weight | Adhesion | Flexibility |
| 1 | 2.0–2.5 | 100 | Ambient | 1.82 | 4.5 | Good | Good. |
| 2 | 2.0–2.5 | 100 | Ambient | 1.64 | 2.7 | do | Do. |
| 3 | 2.0–2.5 | 100 | −15 | 2.62 | 4.3 | Poor | Fair. |
| 4 | 2.0–2.5 | 100 | −15 | 2.74 | 1.7 | Good | Do. |
| 5 | 1.3–1.55 | 50 | −15 | 1.60 | 3.6 | do | Do. |
| 6 | 1.3–1.55 | 50 | −15 | 1.50 | 4.6 | do | Do. |

All of the coatings produced were clear in color and no undesirable arcing occurred during the runs to destroy any portions of the coatings. As can be seen from the coating data, the coating weights of the deposited organic layers are consistently lower than the equivalent coating weights for conventional thermosetting metal coatings, with the exception of run 4. This data illustrates the general trend of organic coatings deposited by employing commercially pure styrene to be of greater corrosion for several of the runs were determined, thus providing a measure of the corrosion protection afforded by the deposited layers.

The varied electrical parameters were as set out in Table 11, below. Those held constant were: voltage at 1000 volts peak-to-peak, frequency at 6 kc., and electrode areas at 36/cm.$^2$ for both. Commercial grade styrene, as in Example IX, was employed for all runs. The weights deposited are as set out in the table of data.

TABLE 11

| | Electrical Parameters | | | | | Pulsing | | | Equivalent Coating Weight, mg./in. |
|---|---|---|---|---|---|---|---|---|---|
| Run | Gas Pressure, mm. Hg. | Current P to P | d, cm. | Electrode Temp., ° C. | Time, Min. | On | Off | Mg./In.$^2$ | |
| 1 | 1.25 | 50 | 0.7 | −40 | 5 | 1 | 1 | 5.27 | 7.4 |
| 2 | 1.25 | 50 | 0.7 | −40 | 5 | 1 | 1 | | |
| 3 | 0.6 | 30 | 0.7 | −40 | 1 | 1 | 1 | 0.58 | |
| 4 | 0.6 | 30 | 0.7 | −40 | 1 | 1 | 1 | 0.55 | |
| 5 | 1.0 | 100 | 0.7 | −40 | 2 | 1 | 1 | 2.20 | |
| 6 | 0.2 | 100 | 0.7 | −40 | 2 | 1 | 1 | 2.58 | |
| 7 | 1.5 | 80 | 0.7 | −40 | 2 | ½ | 2 | 1.32 | 4.0 |
| 8 | 1.5 | 80 | 0.7 | −40 | 2 | ½ | 2 | 1.54 | |
| 9 | 1.9 | 100 | 0.7 | −40 | 2 | ½ | 1 | 2.71 | |
| 10 | 1.9 | 100 | 0.7 | −40 | 2 | ½ | 1 | 1.82 | |
| 11 | 1.9 | 100 | 0.7 | −40 | 2 | ½ | 1 | 2.31 | |
| 12 | 1.9 | 100 | 0.7 | −40 | 2 | ½ | 1 | 1.68 | |
| 13 | 1.3 | 80 | 2.2 | −30 | 2 | 1 | 1 | 6.62 | |
| 14 | 1.55 | 80 | 2.2 | −30 | 2 | 1 | 1 | 6.38 | |

The data of Table 11 were gathered by recording the electrical parameters during each run and then weighing and evaluating (when done) the coatings deposited on each electrode. Thus, the data is for the paired electrode coatings in sequence, runs 1 and 2 being the two electrode layers of a single deposition, and likewise for the remainder. This manner of notation follows that of the preceding table. The dashes in lieu of values indicate that measurements were not made.

On the runs of numbers 1 and 9 the coatings deposited were founded to provide superior corrosion protection than the comparison oleo-resinous thermoset enamel presently used in large amounts in the metal container industry. The comparison enamel is a heat setting oxidizing oleo-resinous material. The higher weights for the equivalent coatings of this oleo-resin enamel indicate that the layer deposited is more corrosion resistant as a lower coating weight provides the same protection against an electrolytic etching solution. Thus, at the low electrode temperatures used, the pulsed current is capable of depositing valuable coating layers.

Other test runs made along the lines of Examples V–X have indicated that the organic materials deposited according to the present invention are in most significant respects equal to or superior than the presently employed thermosetting coatings.

Various activable gaseous materials may be employed for the deposition of organic coatings upon the metal substrate or the electrode pieces attached to the holding plates 16 and 18 of FIGURE 1. The first step in the use of an activable gaseous material other than those specifically mentioned in this description is to plot a series of breakdown voltage curves, such as FIGURE 4, for various current densities and electrode spacings. Once such a series of curves is established, they can then be used to construct portions of the discharge curve of FIGURE 5 and by further variation of the amperage and voltage, the complete curve such as $p_1$ can be established for various pressures. A specific percentage of overdrive amperage into the abnormal glow range can then be calculated and the peak voltage or peak amperage employed for D.C. or the peak-to-peak amperage or peak-to-peak voltage employed for alternating current pulsed energization can be calculated. By comparing the rate of deposition with the pulsed energization to the rate of deposition with continuous energization of the same magnitude with respect to various rest periods D, the optimum rest period can be calculated as shown in FIGURE 8. Thus, the present invention is not to be limited to the specific gaseous materials set out as others can easily be ascertained for correct employment.

As the rest period which is found to be optimum for each individual gaseous material is ascertained, the duty cycle employed can be varied to include this optimum rest time. Generally, a longer lifetime of the active species created allows the duty cycle to be increased from that for the shorter lifetime active species.

As the organic deposition upon the metallic electrode surfaces is somewhat analogous to conventional polymerization processes, in that a flexible solid organic product is formed, a tendency is to analogize this system with conventional polymerization. A factor pointing away from such an analogy is that conventional addition polymerization systems employ active catalysts to promote the initiation step, whereas with the glow discharge polymerization of the present invention no such catalyst is employed. The initiation of the polymerization step is by the expenditure of electrical energy to activate, possibly fragment the activable gas molecules, and/or to cause combinations of radicals, fragments and ions. The propagation and termination steps appear to be by combination or recombination of such radicals, fragments and ions. On the other hand, a factor pointing toward such an analogy is that the life of growing polymer molecular chains in conventional polymerization has been measured to be 2 minutes at 25° C. and 1.24 seconds at 100° C. The average lifetime of the active species for this glow discharge system has been calculated to be approximately 1.2 seconds at the operating temperatures used. In summary, some analogies can be made between the polymerization processes of conventional polymerization while others do not appear to hold.

In order to attain the flexible organic coatings upon the electrode substrate, it is believed necessary that the particular activable gas utilized have a vapor tension at the temperature of the electrode substrate so that some molecular condensation of neutral molecules occurs on the substrate. Also, it is believed necessary that the gaseous molecules employed have a fairly large molecular weight which, in turn, gives such molecules a larger area over which collision with active specie created in the glow region can occur. This, in turn, activates the neutral molecules adsorbed on the electrode surface. Another factor bearing upon selection of an activable gas is that it should be fairly stable and, therefore, possess good resonance stability to better resist complete fragmentation in the high energy glow zone. It is believed that such gases as methane and ethane are firstly of extremely high vapor tension even at low temperatures and, hence, there is not a great amount of adsorption of such molecules on the electrode surface whereby these adsorbed molecules may be polymerized by the impinging active specie from the glow region. The molecular weight and, therefore, the size of such molecules makes the collision cross-section for the active species considerably decreased over the larger molecular forms such as styrene molecules. Another factor with such gases is that the glow discharge condition has a tendency to degrade them into a great many active specie which then create a higher concentration of the type of specie which is capable of impinging on the electrode surfaces to cause a solid organic layer to be built up. In summary, the subjection of alkane gases to an electrical glow discharge to form solid products upon the electrode surfaces is not a very efficient process.

Pure styrene may be employed as the activable gas according to the present invention with either pulsed unidirectional current or alternating currents, providing the use to which the coated product is to be put does not involve fabrication through sharp angles greater than 90 degrees. Styrene and methyl methacrylate mixtures containing from 30 to 70 percent styrene can be employed and, in general, form flexible coatings, particularly when pulsed alternating current is employed as the energizing means. The use of a radical terminator compound, such as t-butyl catechol, butyl nitrite, isoamyl nitrite, n-hexylamine, the various quinones, and dodecyl mercaptan, may be employed with all of these mixtures in a weight proportion of from 1 to 10 parts. Specific compositions of an activable gaseous material which may be employed are: styrene, methyl methacrylate and isoamyl nitrite in weight proportions of 44:46:5, respectively; styrene, methyl methacrylate and n-hexylamine in the weight proportions of 44:46:5, respertively; and styrene and isoamyl nitrite in weight proportions of 100:1 or 95:5 or variations therebetween.

With the use of a radilal terminator compound, somewhat more flexible layers are deposited. This is believed due to the fact that the radical terminator compounds, when present in small percentages, tend to be adsorbed with the activable gas molecules upon the electrode surfaces and thereby serve to terminate the activity of the active species which are bombarding the surface from the glow region. This termination of the activity of such active species apparently occurs rapidly enough and in an amount great enough to lessen the proportion of active specie to the adsorbed neutral molecules so that longer molecular chain growths are allowed prior to cross-linking or interruption by other chain growths. Due to this effect, an activable gas composition containing the radical terminator compound is preferred. In particular, the mixture of styrene, methyl methacrylate and isomyl nitrite having the weight proportions of 44:46:5, respectively, is preferred.

As a general rule for both D.C. and A.C. operation, an increase in current density leads to an increase in the deposition rate and also to an enhancement in the coating process until an optimum deposition condition is attained, when using a given activable gas and operating at a given pressure in the abnormal glow portion of the curves of FIGURE 5. A further increase in the current flow produces no appreciable change in the deposition rate and at the same time leads to degradation of the deposited coating. By operating within the parameter ranges herein set forth, those skilled in the electrical arts can arrive at the optimum set of conditions for the particular activable gas or gases used.

A general trend observable during the experimental work and seen in the above data was that the rate of deposition on the substrates increases as the temperature of that substrate decreases. The coatings deposited on low temperature substrates were generally more soluble in organic solvents than those deposited at elevated temperatures.

In the various tables of data set out herein, the absence of numerical measurements is noted by dashes. Such indicate only that values were not made for the reason that the runs conducted were analogous to those on which complete data was recorded and such values were not believed to have differed significantly from those recorded.

It is obvious that the illustrative practices are not restrictive; and that the invention can be practiced in many ways within the scope of the appended claimed subject matter.

What is claimed is:

1. In a method of sustaining an electrical discharge through an activable gas by passing current between a pair of spaced electrode surfaces at conditions to produce a continuous coating on a metal electrode surface, the improvement comprising supplying the electrical energy to the electrode surfaces in the form of pulsed current to produce a continuous coating which is flexible and adherent to the electrode surfaces, controlling the electrical energy supply to provide an electrical discharge intermediate the electrodes in the abnormal glow region of discharge characteristics and maintaining the current supply until a coating of desired thickness has been deposited.

2. The improvement in the method of claim 1, in which said supplying is with unidirectional current having a pulse width of from 1 microsecond to 2.5 milliseconds.

3. The improvement in the method of claim 1, in which said supplying is with alternating current having a pulse width of from 100 milliseconds to 5 seconds.

4. The method of forming a solid organic coating upon a substrate comprising the steps of placing the substrate in a vessel and maintaining a sub-atmospheric pressure in said vessel, introducing into the vessel a vapor of a substance activable by an electrical field, establishing an electric field through said vapor to the substrate by applying a pulsed electrical field therethrough to effect formation of a non-arcing, self-sustained electrical discharge condition in the vapor and at the surface of the substrate, maintaining the electrical field until a coating of desired thickness has been deposited upon the substrate, and controlling the current in the area of said discharge to provide glow discharge characteristics in the abnormal glow region of such characteristics occurring at discharge currents less than that required for arcing and higher than that in the normal glow region.

5. The method of claim 4 in which said establishing an electric field is by applying a unidirectional electric charge having a pulse width of from 1 microsecond to 2.5 milliseconds.

6. The method of claim 4 in which said establishing an electric field is by applying an alternating current electric charge having a pulse width of from 100 milliseconds to 5 seconds.

7. The method of forming a flexible solid organic layer upon a metal substrate comprising the steps of placing a pair of spaced metallic electrodes in a vessel, introducing a gaseous monomer substance selected from the group consisting of styrene and mixtures of styrene and methyl methacrylate containing at least 30% styrene to maintain a sub-atmospheric pressure within the vessel, supplying a pulsed current to the pair of electrodes to produce a non-arcing self-sustaining electrical discharge for a time sufficient to allow a coating of desired thickness to be deposited upon the surface, and controlling current in the area of said discharge to provide discharge characteristics in the abnormal glow region of such characteristics.

8. The method of claim 7 in which the monomer substance includes a minor percentage of a radical terminator compound.

9. The method of claim 7 in which said supplying is with unidirectional current having a pulse width of from 1 microsecond to 2.5 milliseconds.

10. The method of claim 7 in which said supplying is with alternating current having a pulsed width of from 100 milliseconds to 5 seconds.

11. In the method of sustaining an electrical discharge through an activatable gas by passing current between a pair of spaced electrode surfaces at conditions to produce a continuous coating on a metal electrode surface, the improvement comprising supplying the electrical energy to the electrical surface in the form of pulsed current at a current density of 0.165 to 1.4 ma./cm.$^2$ (RMS) between the electrode surfaces and at a peak voltage sufficient to effect abnormal glow discharge between the electrode surfaces, to produce a continuous coating which is flexible and adherent to the electrode surfaces, and maintaining the current supply until a coating of desired thickness has been deposited.

12. The method of forming a flexible solid organic layer upon a metal substrate comprising the steps of placing a pair of spaced metallic electrodes in a vessel, introducing a gaseous monomer substance selected from the group consisting of styrene and mixtures of styrene and methyl methacrylate containing at least 30% styrene to maintain a sub-atmospheric pressure within the vessel, supplying a pulsed current at a current density of from 0.165 to 1.4 ma./cm.$^2$ (RMS) between the electrode surfaces and at a peak voltage to the pair of electrodes to produce a non-arcing self-sustaining abnormal glow discharge, and maintaining the current supply until a coating of desired thickness has been deposited.

13. The method of making a metal-organic layer laminate which is deformable and fabricable as an integral unit comprising the steps of subjecting a gaseous monomer substance selected from the group consisting of styrene and mixtures of styrene and methyl methacrylate containing at least 30% styrene to an abnormal glow discharge between two spaced metal electrodes, maintaining the abnormal glow discharge by imposing pulsed unidirectional current at a current density of 0.5 to 1.4 ma./cm.$^2$ (RMS) between the electrodes and at a peak potential of from 600 to 1200 volts and within a pulse width of from 1 microsecond to 2.5 milliseconds and a duty cycle of $10^{-4}$ to 0.25%, and continuing the abnormal glow discharge for a time sufficient to deposit an organic layer of desired thickness upon the metal surface.

14. In the method of sustaining an electrical discharge through an activable gas by passing current between a pair of spaced electrode surfaces at conditions to produce a continuous coat on the electrode surfaces, the improvement comprising supplying pulsed unidirectional current to the electrodes at a current density of from 0.5 to 1.4 ma./cm.$^2$ (RMS) and at peak potential of from 600 to 1200 volts to provide a glow discharge intermediate the spaced electrodes in the abnormal glow discharge current region.

15. The improvement of the method of claim 14 in which the activable gas is selected from the group consisting of styrene and mixtures of styrene and methyl methacrylate containing at least 30% styrene.

16. The improvement in the method of claim 15 wherein the activable gas includes a minor percentage of a radical terminator compound.

17. The method of forming a flexible solid organic layer upon a metal substrate to produce a metal-organic layer laminate which is deformable and fabricable as an integral unit comprising the steps of, placing a pair of spaced metal electrodes in a vessel, introducing a gaseous monomer substance selected from the group consisting of styrene and mixtures of styrene and methyl methacrylate containing at least 30% styrene, together with a minor part of a radical terminator selected from the group consisting of t-butyl catechol, isoamyl nitrite, n-hexylamine and dodecyl mercaptan to maintain a pressure of from 500 microns to 1.5 millimeters Hg within the vessel, providing an abnormal glow discharge by supplying a pulsed unidirectional current to the pair of metallic electrodes at a current density of from 0.5 to 1.4 ma./cm.$^2$ (RMS) and at a peak voltage sufficient to provide said abnormal glow discharge and with a pulse width of from 1 microsecond to 2.5 milliseconds and a duty cycle of $10^{-4}$ to 0.25%, and discontinuing the glow discharge prior to the development of an arcing condition.

18. The process of forming a continuous, flexible, metal adherent coating on a metal electrode by maintaining an electrical discharge through an activable gas by passing current between a pair of spaced electrode surfaces comprising, initiating a self-sustaining non-arcing electrical discharge at a pressure, electrode spacing and voltage at which breakdown potential is instantaneously exceeded to produce a current transmission effect between the electrodes in excess of that for a uniform surface coverage by the electrical discharge and to provide glow discharge intermediate the spaced electrodes and in the abnormal glow discharge current region, and supplying pulsed unidirectional current to sustain the electrical discharge at a voltage at least as great as in said initiating step and the pulsed current having a pulsed width of from 1 microsecond to 2.5 milliseconds and a duty cycle of $10^{-4}$ to 0.25%.

19. The process of claim 18 wherein the activable gas is selected from the group consisting of styrene and mixtures of styrene and methyl methacrylate containing at least 30% styrene.

20. The method of forming a flexible solid organic layer upon a metal substrate comprising the steps of placing a pair of spaced metallic electrodes in a vessel, introducing a gaseous monomer substance selected from the group consisting of styrene and mixtures of styrene and methyl methacrylate containing at least 30% styrene to maintain a sub-atmospheric pressure within the vessel, and supplying a pulsed alternating current at a current density of from 0.165 to 1.2 ma./cm.$^2$ (RMS) between the electrode surfaces and at a peak to peak potential of from 600 to 1200 volts to produce a non-arcing self-sustaining electrical discharge of abnormal glow characteristics.

21. The method of claim 20 in which said supplying is with a pulse width of from 100 milliseconds to 5 seconds and a duty cycle of from 16 to 90 percent.

22. The method of making a metal-organic layer laminate which is deformable and fabricable as an integral unit comprising the steps of subjecting a gaseous monomer substance selected from the group consisting of styrene and mixtures of styrene and methyl methacrylate containing at least 30% styrene to a glow discharge between two spaced metal electrodes, maintaining the glow discharge by imposing pulsed alternating current at a current density of 0.165 to 1.2 ma./cm.$^2$ (RMS) between the electrodes at a peak to peak potential of from 600 to 1200 volts and with a pulse width of from 100 milliseconds to 5 seconds and a duty cycle of from 16 to 90 percent, continuing the glow discharge for a time sufficient to deposit an organic layer of desired thickness upon the metal electrode surface and controlling the discharge by providing discharge current in the abnormal glow region of discharge characteristics and less than produces arcing intermediate the spaced electrodes.

23. In the method of sustaining an electrical discharge through an activable gas by passing current between a pair of spaced electrode surfaces at conditions to produce a continuous coating on the electrode surfaces, the improvement comprising supplying pulsed alternating current to the electrodes and controlling current density to from 0.165 to 1.2 ma./cm.$^2$ (RMS) and at a peak to peak potential of from 600 to 1200 volts to provide abnormal glow discharge characteristics intermediate the electrode surfaces without arcing.

24. The improvement of the method of claim 23 in which the activable gas is selected from the group consisting of styrene and mixtures of styrene and methyl methacrylate containing at least 30% styrene.

25. The improvement in the method of claim 24 wherein the activable gas includes a minor percentage of a radical terminator compound.

26. The method of forming a flexible solid organic layer upon a metal substrate to produce a metal-organic layer laminate which is deformable and fabricable as an integral until comprising the steps of placing a pair of spaced metal electrodes in a vessel, introducing a gaseous monomer substance selected from the group consisting of styrene and mixtures of styrene and methyl methacrylate containing at least 30% styrene, together with a minor part of a radical terminator compound selected from the group consisting of t-butyl catechol, butyl nitrite, isoamyl nitrite, a-hexylamine and dodecyl mercaptan to maintain a pressure of from 500 microns to 2.5 millimeters Hg within the vessel, supplying a pulsed alternating current to the pair of metallic electrodes to provide abnormal glow characteristics short of arcing at a current density of from 0.165 to 1.2 ma./cm.$^2$ (RMS) and at a peak to peak potential of from 600 to 1200 volts and with a pulse width of from 100 milliseconds to 5 seconds and a duty cycle of from 16 to 90 percent, and discontinuing the glow discharge prior to the development of an arcing condition.

27. The process of forming a continuous flexible, metal adherent coating upon a metal electrode by maintaining an electric discharge through an activable gas by passing current between a pair of spaced electrode surfaces comprising, initiating a self-sustaining non-arcing electric discharge at a pressure, electrode spacing and voltage at which breakdown potential is instantaneously exceeded to produce a current transmission effect between the electrodes at a current exceeding the normal self-sustaining glow discharge range of currents and less than produces arcing to provide a uniform surface coverage by the electrical discharge, and supplying pulsed alternating current to sustain the electrical discharge at a voltage at least as great as in said initiating step and the pulsed current having a pulse width of from 1 millisecond to 5 seconds and a duty cycle of from 16 to 90 percent to provide increased flexibility in the deposited coating.

28. The process of claim 27 wherein the activable gas is selected from the group consisting of styrene and mixtures of styrene and methyl methacrylate containing at least 30% styrene.

29. The method of forming a solid organic coating upon a substrate comprising the steps of placing the substrate in a vessel and maintaining a sub-atmospheric pressure in said vessel, introducing into the vessel a vapor of a substance activable by an electrical field, establishing an electric field through said vapor to the substrate by applying a pulsed electrical charge therethrough to effect formation of a non-arcing self-sustaining electrical discharge condition in the vapor and at the surface of the substrate, cooling the substrate by the passage of a coolant fluid through associated heat conductive parts in the vessel, maintaining the pulsed electrical charge until a coating of desired thickness has been deposited upon the substrate, providing sufficient lapses between pulses to increase flexibility in the coating and maintaining the electrical discharge condition within the abnormal glow discharge current range, less than produces arcing and greater than the normal self-sustaining discharge current range, to provide complete uniform coating across the substrate.

30. The method of claim 29 in which said establishing an electric field is by applying a unidirectional electric charge having a pulse width of from 1 microsecond to 2.5 milliseconds.

31. The method of claim 29 in which said establishing an electric field is by applying an alternating current electric charge having a pulse width of from 100 milliseconds to 5 seconds.

32. The coating for a metal surface produced by the method of claim 1.

33. The coating for a metal surface produced by the method of claim 17.

34. The coating for a metal surface produced by the method of claim 26.

35. The method of claim 17, wherein the temperatures of the metal electrodes are maintained between −40° to 50° C. during the forming of the flexible solid organic layer.

36. The method of claim 26, wherein the temperatures of the metal electrodes are maintained between −40° to 50° C. during the forming of the flexible solid organic layer.

References Cited

UNITED STATES PATENTS

| | | | |
|---|---|---|---|
| 3,068,510 | 12/1962 | Coleman | 204—165 X |
| 3,205,162 | 9/1965 | MacLean | 204—165 X |
| 3,252,830 | 5/1966 | Cummin et al. | 117—93.1 X |

ALFRED L. LEAVITT, Primary Examiner

J. H. NEWSOME, Assistant Examiner

U.S. Cl. X.R.

117—132; 204—165, 168